United States Patent
Corsette

[15] 3,669,316
[45] June 13, 1972

[54] CARTRIDGE VALVE DISPENSER WITH PRESSURE REGULATING VALVE

[72] Inventor: Douglas F. Corsette, Los Angeles, Calif.
[73] Assignee: Diamond International Corporation, New York, N.Y.
[22] Filed: July 27, 1970
[21] Appl. No.: 58,583

[52] U.S. Cl. .................. 222/193, 222/397, 222/402.24, 239/308
[51] Int. Cl. ............................................. B67d 5/54
[58] Field of Search ............... 222/188, 107, 193, 402.24, 222/397, 399; 239/306, 307, 308, 579

[56] References Cited

UNITED STATES PATENTS

| | | | |
|---|---|---|---|
| 3,469,744 | 9/1969 | Corsette | 222/193 |
| 3,527,388 | 9/1970 | Cooprider | 239/308 X |
| 3,289,949 | 12/1966 | Roth | 239/579 |
| 3,451,596 | 6/1969 | Marand | 222/193 |
| 3,420,413 | 1/1969 | Corsette | 222/107 |

Primary Examiner—Samuel F. Coleman
Assistant Examiner—Larry Martin
Attorney—Watson, Cole, Grindle & Watson

[57] ABSTRACT

A valve plunger movable through an opening in the wall of the product container, cooperates with a valve housing which receives product from the container and with a propellant cartridge carried by such housing within the container. Discharge of the propellant through a passage in the plunger in aspirating relation to a passage from the valve housing induces a flow of product which is discharged together with the propellant into the atmosphere. A resiliently deformable annular valve within the product container is clamped between the valve housing and the container wall with its inner periphery in sealing engagement with the valve plunger to prevent leakage of product externally of the plunger through the opening in which the plunger moves. The outer peripheral portion of the valve projects outwardly from the housing and across an annular channel encircling the housing to sealingly engage an annular valve seat concentric with the annular channel. The channel communicates with the atmosphere through the aforesaid opening and atmospheric air entering said channel may unseat the valve to permit influx of atmospheric air into the container for pressure equalizing purposes. One or more grooves or passages opening from the channel through the valve seat at locations normally covered by the valve, are uncovered in the event the valve is deformed by an internal superatmospheric pressure so as to be depressed into the annular channel and rocked about the inner edge of the valve seat whereby to uncover the vent passage.

12 Claims, 3 Drawing Figures

PATENTED JUN 13 1972 3,669,316

INVENTOR,
DOUGLAS F. CORSETTE

BY
Watson, Cole,
Grindle & Watson

ATTORNEYS

INVENTOR,
DOUGLAS F. CORSETTE
BY
Watson, Cole,
Grindle & Watson
ATTORNEYS

CARTRIDGE VALVE DISPENSER WITH PRESSURE REGULATING VALVE

BACKGROUND OF THE INVENTION

This invention relates to an improved venting means for a dispenser-equipped product container of the class in which the propellant is housed within a cartridge or chamber within the product container and is controllably released through actuation of a valve plunger movable through an opening in the wall of the container to withdraw product from the container by virtue of the aspirating relation of separate propellant and product discharge passages extending through the plunger.

The confining of the pressurized propellant within a cartridge or chamber which is housed within the outer or product container theoretically has the advantage of freeing the product container from the requirement that it be capable of withstanding substantial internal pressures. However, it has been found that in such an aspirating type dispenser as above described, the propellant sometimes escapes from the cartridge into the surrounding product container, as for instance through imperfect seating of the propellant valve, or through seepage or permeation through the resilient valving means or gaskets commonly employed in propellant valves. This may result in the build-up of superatmospheric pressures which, in the case of containers not especially adapted to withstand high internal pressures, may create a hazardous condition by virtue of the possibility of an explosion of the container.

My prior U.S. Pat. No. 3,469,744, of Sept. 30, 1969 discloses how to solve this problem by an improved venting means in the form of a diaphragm valve, the opposite sides of which are subjected to atmospheric pressure and to the internal pressure within the product container respectively. The valve is actuated accordingly either to admit atmospheric air into the container or to release superatmospheric pressures from the container. In said patent the inner periphery of the annular diaphragm valve encircles and sealingly engages a cylindrical portion of the dispenser, and is movable axially along same in accordance with the differential pressures on opposite sides of such valve to achieve its valving action. In the present invention, there is provided an improved and simplified annular valve, the outer peripheral portion of which cooperates with a valve seat to achieve automatically the functions of releasing excess pressure from the product container and of admitting atmospheric air into the container either to replace the product withdrawn therefrom or to restore atmospheric pressure when the internal pressure of the product container is reduced below atmospheric for any reason.

In addition, utilization of the outer peripheral portion of the valve for pressure equalizing functions renders the inner periphery thereof free for use in providing a seal around the valve plunger for preventing product leakage, as well as a valve seat for cooperation with the product valve.

The preferred exemplification of the invention is illustrated in the accompanying drawings in which.

Figure 1:
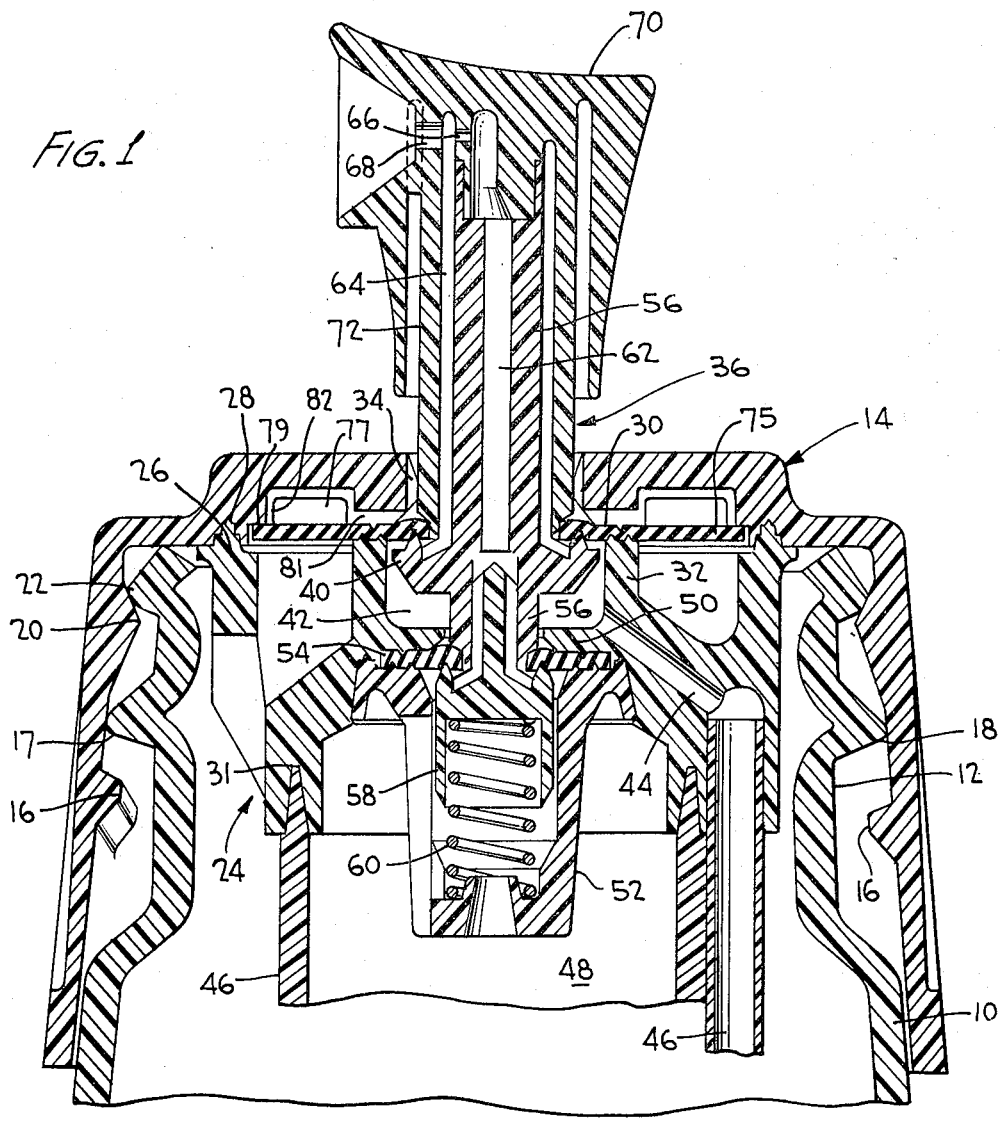
FIG. 1 is a vertical axial cross-section through the upper portion of a container to which an aspirating dispenser incorporating the invention has been applied, the container and dispenser structure being illustrated fragmentarily, and the dispenser being in its closed or non-dispensing condition.

Referring now in detail to the accompanying drawings, the numeral 10 therein designates a suitable outer container adapted for dispensing by aspiration. Since the container need not be capable of withstanding substantial internal pressures, it may be of a conventional plastic, glass or other suitable material and of any desired configuration, though in the present instance, it is provided with a neck 12 defining a filling opening which is normally closed and sealed by a closure cap 14 of any conventional type. The particular closure cap 14 herein illustrated, by way of exemplification, is of the type disclosed in my U.S. Pat. No. 3,420,413, granted Jan. 7, 1969, in which lugs 16 within the closure skirt cooperate with threads 18 around the container neck to pull the internal snap bead 20 of the closure cap over and into operative relation with the external snap bead 22 of the container neck. The snap beads 20 and 22 coact after movement byond their dead center or neutral position to cam the end wall of the closure cap firmly into engagement with the end of the neck 12 and to disengage the lug 16 from the threads 18 to prevent subsequent cooperation of these threads and lugs for the purpose of removing the closure cap.

Supported by the closure cap 14 within the container is a valve body or housing 24 preferably of circular cross-section having an upwardly directed outer annular wall 26, an upper edge portion of which is received in a conformingly shaped annular groove 28 in the inner surface of the closure cap end wall and is preferably fused or otherwise secured to the closure as by sonic welding or spin welding.

An annular gasket 30 of a resiliently deformable material such as natural or artificial rubber is clamped between the lower face of the closure cap end wall and an upwardly presented annular rib 32 of the valve body. The walls or ribs 26, 32 and gasket 30 are all arranged concentrically to an opening 34 through the end wall of the closure cap, through which opening the valve plunger 36 is movable. The inner periphery of the gasket 30 encircles and sealingly engages the plunger 36 and also, in the present embodiment, functions as a valve seat for the product valve 40 carried by the plunger within a valve chamber 42. Product from the container is drawn into this chamber 42 through a passage 44 in the housing communicating with a dip tube 46 which extends to a location near the bottom of the product container and thus below the level of the flowable product therein.

The lower end of the housing 24 cooperates with the generally cylindrical body or cartridge 46 to define an enclosed chamber 48 for a suitable pressurized propellant within the product container 10. The cartridge 46 and housing 24 in the preferred embodiment are both formed of a suitable plastic and connected in fluid tight relation by sonic or spin welding.

The valve plunger 36 extends and is movable through the valve chamber 42 and through an opening in the partition 50 which separates the valve chamber 42 from the propellant chamber 48.

Within the upper end of the propellant chamber 48 in alignment with the aforesaid opening is a valve cage 52, the base of which is secured to the housing 24. A resilient gasket 54 is clamped between the housing 24 and the base of the valve cage. The inner periphery of this gasket 54 encircles and sealingly engages a hollow valve stem 56 of the plunger. Carried by this valve stem for movement within the cage 52 is a propellant valve 58 which is normally seated against the undersurface of the gasket 54 by a spring 60 compressed between the valve and the bottom of the cage 52, as well as by the pressure of the propellant within the chamber 48.

The spring 60, together with the pressure of the propellant normally maintains the entire valve plunger 36 in its fully raised and closed position as shown in FIG. 1, in which both the propellant valve 58 and the product valve 40 are seated against their respective valve seats 54 and 38.

As is customary in dispensers of the type here involved, the tubular valve stem 56 defines a propellant discharge passage 62, the lower end of which opens outwardly beneath the valve seat 54 for communication with the propellant chamber 48 when the propellant valve 58 is unseated by depression of the valve plunger 36. The passage 62 extends from the valve stem 56 into the plunger discharge head 70 where it is in aspirating relation with a product passage 64 through a propellant orifice 66 aligned with the discharge orifice 68 at the external end of the plunger discharge head 70.

In the embodiment here illustrated, the plunger discharge head 70 is suitably coupled to the upper end of the hollow valve stem 56 and is provided with a depending skirt 72 which encircles the valve stem to define the major portion of the product passage 64, the upper end of said passage continuing into the discharge head 70. The lower end of the skirt 72 extends inwardly through the opening 34 in the container closure and is sealingly engaged by the inner periphery of the combined valve seat and gasket 30 within the product valve chamber 42. The lower end of the product passage 64 opens outwardly between the lower end of the skirt 72 and the product valve 40 for communication with the product chamber 42 when the product valve 40 is unseated.

It will be apparent that it is normally desirable to prevent communication between the product within the container 10 and the atmosphere, so as to avoid leakage of the product. However, it is desirable to permit influx of atmospheric air into the product container to replace the product which is discharged therefrom during a dispensing operation. Similarly, during periods of non-use of the dispenser it is desirable to permit influx of atmospheric air into the product container when necessary to prevent creation within the container of a pressure substantially below atmospheric, such as might result, for instance, from substantial temperature changes. Manifestly, substantial subatmospheric pressures within the container may produce unsightly distortion.

Similarly, in order to avoid deformation and possible rupture or explosion of the product container by superatmospheric pressures therein arising from defective or improperly seated propellant valve 58 or through permeation of the resilient gasket and valve seat 54 by the propellant, it is desirable also to permit discharge of excessive pressures from the product container, particularly during periods of non-use thereof, as, for instance, during storage or shipping.

For achieving both of these functions, there is provided a resiliently deformable annular pressure equalizing valve 75 which is secured in fluid-tight relation to the valve housing 24 throughout an annular zone spaced inwardly from the outer periphery of the valve, preferably being clamped between the upstanding rib or wall 32 of the valve housing 24 and the end wall of the container closure concentrically to the opening 34 therethrough. Advantageously, the valve 75 is integral with and constitutes a radial outward extension of the annular gasket and valve seat 30 for the product valve 40, though from a broader standpoint, such relationship is not essential.

From the housing wall or rib 32, the pressure equalizing valve 75 projects outwardly across an annular channel 77 formed in the end wall of the closure cap concentrically to opening 34, and normally is seated in fluid-tight relation against an annular valve seat 79 on the container closure end wall concentrically surrounding and contiguous to the channel 77. Channel 77 communicates with the atmosphere so that the upper or outer side of the valve 75 is subjected to atmospheric pressure, whereas the inner or lower side thereof is subjected to the internal pressure of the container 10, and the valve is urged toward or away from its seat 79 responsive to differences in these pressures. In the present instance, communication between channel 77 and the atmosphere is by way of one or more radial grooves 81 formed in the closure cap end wall and extending between the channel 77 and the central opening 34 through which the valve plunger 36 moves, the normal clearance between such opening and the valve plunger permitting ingress and egress of atmospheric air to and from the channel 77. Thus, in the event of a reduction of the internal pressure of the container below atmospheric, the air from the atmosphere may flow through the opening 34 and grooves 81 into the channel 77 to flex the outer periphery of the valve 75 away from its seat 79 so that such atmospheric air may enter the container and bring the pressure therein substantially to atmospheric, following which the resiliency of the valve will return it into engagement with its seat 79.

In order to permit the discharge of excessive internal pressures from the container, there are provided one or more vent passages 82, here in the form of grooves in the outer side walls of the channel and opening through the valve seat 79 so as normally to be covered and closed by the valve when it engages the seat.

Figure 3:
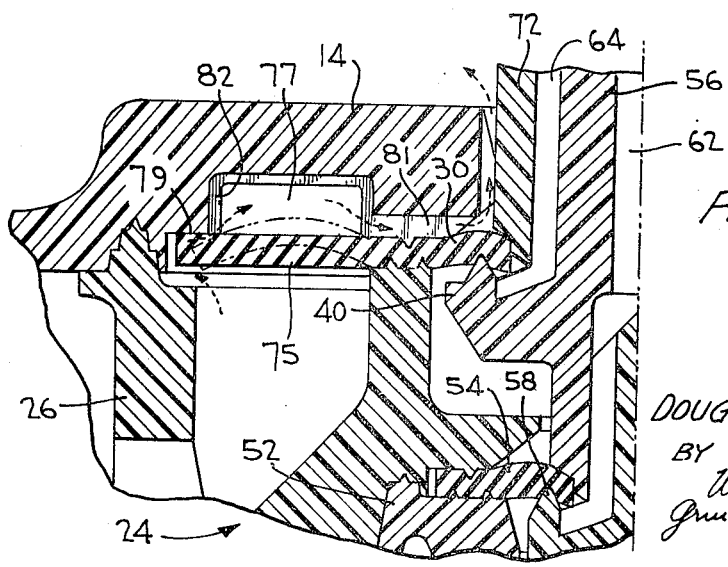
FIG. 3 is an enlarged fragmentary section in the same plane as FIGS. 1 and 2, but showing the pressure equalizing valve deformed by superatmospheric pressure within the product container to release the excess pressure to the atmosphere.

In the event the pressure within the container 10 for any reason substantially exceeds the external atmospheric pressure, such excessive pressure exerted against the lower or inner face of the valve 75 will deform the valve by causing it to flex into the channel 77 in substantially the manner illustrated in broken lines in FIG. 3, whereby the outer peripheral portion of the valve is rocked about the inner edge of the valve seat 79 at its juncture with the outer side wall of the channel 77 to uncover the vent passage or passages 82, and thereby to establish communication between the container interior and the channel 77 which, in turn, communicates with the atmosphere.

In order to permit communication across the channel 77 in the event the valve 75 is sufficiently deformed to engage the bottom of the latter, the groove or grooves 82 preferably continue across the bottom of the channel and thence across the inner wall thereof into communication with the respective grooves 81 leading from the channel to the central opening 34 through the container closure cap.

By way of brief summarization of the operation of the invention, under normal conditions when the plunger valve is in its non-dispensing or inoperative position as shown in FIG. 1, with the valve plunger projected upwardly by spring 60 and the propellent pressure, both the product and propellant valves 40 and 58, respectively, will be seated against their associated gaskets or valve seats 30 and 54, respectively. As long as the pressure within the product container 10 remains substantially equal to atmospheric pressure, the pressure equalizing valve 75 will be seated against the annular valve seat 79 to seal the interior of the container from communication with the atmosphere, thus to prevent loss by evaporation or by leakage in the event the container is tilted or inverted.

Figure 2:
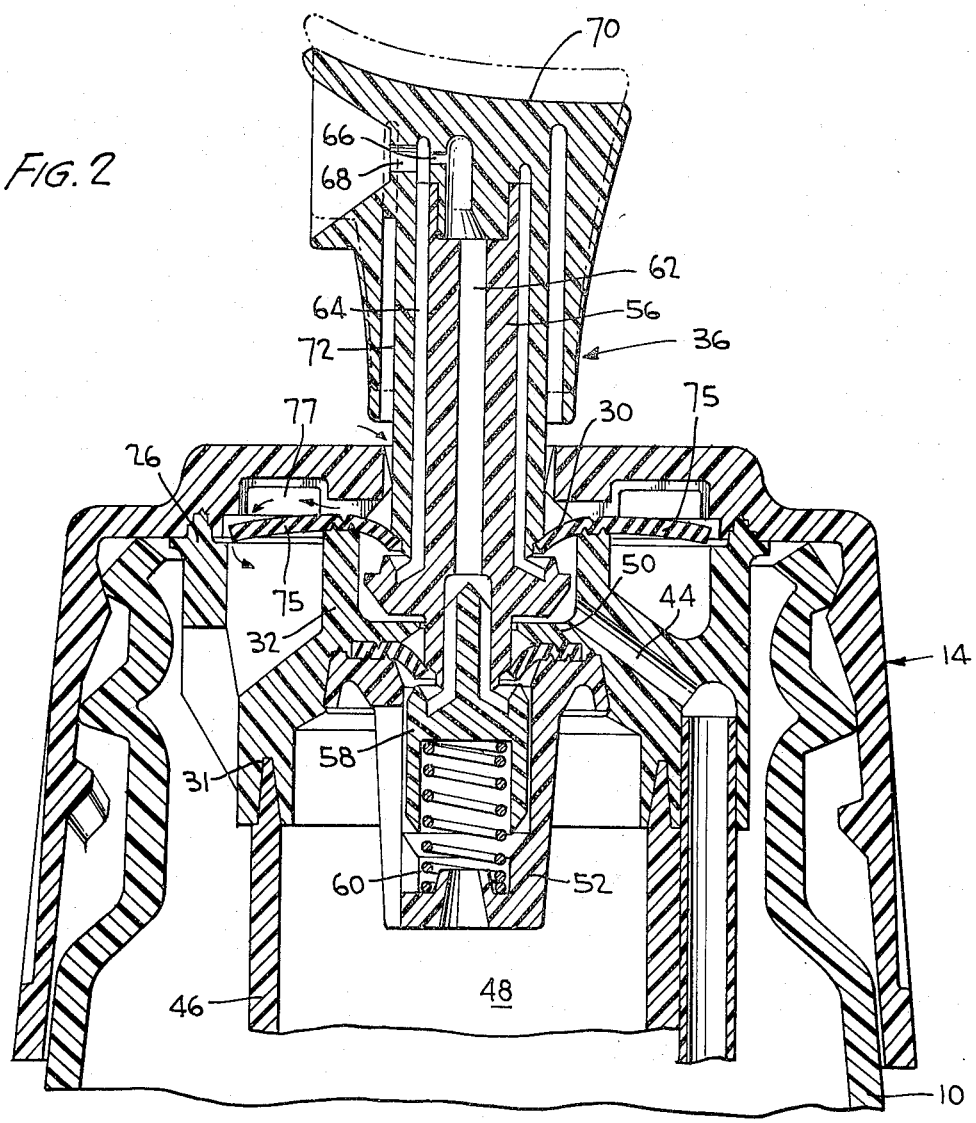
FIG. 2 is a view similar to FIG. 1, but with the valve plunger depressed to its dispensing condition, and the pressure equalizing valve unseated to permit entry of atmospheric air into the product container for replacement of the dispensed product.

Dispensing of the product is produced in well-known manner by exerting finger pressure on the upper end of the plunger discharge head 70 to depress the plunger from its normal fully projected and closed position as shown in FIG. 1 (and, in broken lines, in FIG. 2), to a dispensing position as shown in full lines in FIG. 2. In this position, both the product and the propellant valves 40 and 58 are unseated. The propellant will therefore be discharged from the propellant chamber 48 through the propellant discharge passage 62 and thence through the propellant orifice 66 and in aspirating relation across the upper end of the product passage 64 to induce a flow of propellant from the container upwardly through the dip tube 46, passage 44, valve chamber 42 and product discharge passage 64. The product is thus entrained in the propellant and discharged together therewith through the discharge orifice 68 of the plunger discharge head 70. As the product is discharged from the container 10, this will normally result in the creation of a reduced or sub-atmospheric pressure within the container, whereby the atmospheric pressure in channel 77 will deflect the outer periphery of the pressure equalizing valve 75 downwardly away from its seat 79 in the manner shown in FIG. 2 to permit an influx of air into the product container substantially along the flow path indicated by the arrows in FIG. 2. When the valve plunger 36 is returned to its closed position, as in FIG. 1, at the end of the dispensing operation, and sufficient air has entered the container to achieve an atmospheric pressure therein, the normal resiliency of the pressure equalizing valve 75 will return it into sealing engagement with the seat 79. Manifestly, however, the admission of air through this valve 75 into the container may occur at any time that the pressure within the container drops below atmospheric pressure, regardless of the position of the valve plunger 36.

In the event the pressurized propellant should escape from the cartridge 46 by permeation through the gasket 54 or through imperfect seating of the valve 58, it will enter the valve chamber 42 and then normally will flow through the passage 44 and dip tube 46 into the product container 10. However, as soon as the pressure built up within the product container 10 reaches a sufficient magnitude to flex or deform the valve 75 into the channel 77 substantially as shown in broken lines in FIG. 3, this will unseat the outer peripheral portion of the valve to uncover the passage 82 so that the excess pressure within the container may be released through this passage and thence along the flow path indicated by the arrows in FIG. 3. When the pressure within the container is sufficiently relieved, the resiliency of the valve 75 will cause it again to sealingly engage its seat 79.

Having thus described my invention, I claim:

1. Dispensing apparatus of the class in which a valve plunger is movable through an opening in the wall of a container of flowable product, and formed with propellant and product passages in aspirating relation to each other, leading from separate propellant and product chambers within the container to a discharge orifice externally of the container, said product chamber being defined by a housing around said plunger within the container and receiving flowable product from the container, said plunger being movable from a normally closed position in which it isolates said passages from the respective chambers to a dispensing position in which it establishes communication between said passages and the respective chambers, wherein the improvement comprises: an annular resiliently deformable pressure equalizing valve secured in fluid-tight relation to the housing throughout an annular zone spaced inwardly from its outer periphery, the outer peripheral portion of said pressure equalizing valve projecting across an annular channel formed in the inner wall of the container concentrically to said valve, and in constant communication with said opening, and an annular valve seat on said inner wall concentrically surrounding said channel and directed inwardly toward the interior of the container, there being a vent passage opening from the channel through said seat, said valve being located inwardly of the container from said seat and normally spanning the channel to engage said seat to close said vent passage, but being capable of flexing inwardly of the container away from said seat to admit atmospheric air into the container, and capable of deformation into said channel to uncover said vent passage and thereby to permit release of excess pressure from the container.

2. Dispensing apparatus as defined in claim 1, in which said vent passage is defined by a groove in the outer wall of said channel opening through said valve seat.

3. Dispensing apparatus as defined in claim 1, in which an annular inner-peripheral portion of said annular valve extends into the said product chamber into sealing engagement with the said plunger, the said product valve seating against the under surface of said inner-peripheral portion in the raised position of the plunger and being unseated therefrom in the depressed position of the plunger.

4. Dispensing apparatus as defined in claim 1, in which the said channel concentrically surrounds said opening in the container and communicates therewith by way of a radial passage.

5. Dispensing apparatus as defined in claim 4, in which the bottom of said channel is provided with a generally radially extending groove there-across to permit flow across said channel when the latter is occupied by the deformed valve.

6. Dispensing apparatus of the class in which a valve plunger is movable through an opening in the wall of a container of flowable product, and formed with propellant and product passages in aspirating relation to each other leading from separate propellant and product chambers within the container to a discharge orifice externally of the container, said product chamber being defined by a housing around said plunger within the container and receiving flowable product from the container, said plunger being movable from a normally closed position in which it isolates said passages from the respective chambers to a dispensing position in which it establishes communication between said passages and the respective chambers, wherein the improvement comprises an annular resiliently deformable gasket clamped between said container and the housing and in sealing relation with the housing throughout an annular zone which is spaced radially from its inner and outer peripheries, said inner periphery engaging and in sealing relation with said plunger to isolate the product chamber from said opening, said container being formed with an annular channel around said housing in communication with the atmosphere, an annular valve seat surrounding said channel, and a vent passage opening from the channel through said seat, the outer peripheral portion of the gasket spanning said channel and normally engaging said seat to close said vent passage when the pressures on opposite sides of said portion are substantially equalized, but being free to flex inwardly away from said seat to admit atmospheric air into the container when the pressure therein becomes subatmospheric, said outer peripheral portion being capable of deformation into the channel by a superatmospheric pressure within the container to uncover said vent passage by rocking about the inner edge of said seat, whereby to release said superatmospheric pressure.

7. A closure cap for application to a container, and an aspirating-type dispenser carried by said closure cap for dispensing a flowable product from a container to which said closure cap is applied, said dispenser extending through an opening in the wall of the closure cap and comprising a valve housing and a propellant cartridge, both supported from the cap for disposition within the container, said housing being adjacent and aligned with said opening, wherein the improvement comprises a resiliently deformable annular pressure equalizing valve having an inner portion in sealing engagement with said housing and an outer peripheral portion normally in sealing engagement with the said wall of the closure cap in an annular zone around and concentric to said opening, whereby normally to isolate said opening from the interior of the container, said wall of the closure cap being formed with an annular channel between said zone and said opening, said channel communicating constantly with the atmosphere, and a vent passage opening from the channel through said zone at a location to be covered by said valve, whereby upon the creation of a sub-atmospheric pressure within the container, the atmospheric pressure will flex the outer peripheral portion of the valve away from said zone to permit influx of atmospheric air into the container, and upon creation of a superatmospheric pressure within the container such superatmospheric pressure will flex said valve into the channel, thus rocking its outer peripheral portion inwardly about the inner edge of said zone whereby to uncover said vent passage.

8. The combination defined in claim 7, wherein said valve housing includes an annular wall presented toward the said wall of the container, the said pressure equalizing valve being clamped between said annular wall and the container and projecting radially outwardly from and concentrically to said annular wall, said housing also including an annular supporting wall spaced radially outwardly from the first said annular wall and firmly secured to the container wall in an annular zone radially outwardly of and concentrically to the said annular valve.

9. An aspirating type flowable product dispenser of the type in which a propellant cartridge is supported from a valve housing carried by a closure cap within a product container, the propellant being controllably released through a valve plunger which is movable through aligned openings in the closure cap and the valve housing to control a propellant discharge valve communicating with the cartridge, the valve housing defining a chamber around the plunger within which the plunger carries a product valve for movement therewith into and from seated relation with an annular valve seat, the said plunger being formed with separate product and propellant passages which communicate with the said chamber and with the propellant cartridge respectively, when said plunger is positioned to open the product and propellant valves, the product and propellant valves both communicating with a discharge orifice in the external portion of the plunger and the propellant passage being in aspirating relation with the product passage; wherein the improvement comprises a flat resiliently deformable annular valve encircling and secured to the valve housing, the undersurface of said closure cap being formed with an annular channel located radially outwardly from said housing and normally in communication with the atmosphere through a breather passage, and with a flat annular valve seat concentrically encircling said channel, there being a groove in the outer wall of said channel opening through said valve seat, the outer peripheral portion of said annular valve being beneath and normally engaging said seat and covering said groove when the pressures on opposite sides of said annular valve are substantially balanced, but being capable of flexing away from said seat to permit influx of atmospheric air from said channel into the product container when internal pressure in the container is less than atmospheric pressure, said annular valve being capable of deformation into the channel by superatmospheric pressure within the container to rock the outer peripheral portion thereof about the inner edge of said seat and uncover said groove for release of said superatmospheric pressure.

10. An aspirating type flowable product dispenser as defined in claim 9, wherein said valve housing comprises an annular upstanding wall directed toward the cap and defining said chamber, means securing said valve housing to the cap at a radial location spaced outwardly from said wall whereby to provide an annular space between said wall and said means for reception of the valve, said valve member being clamped between said wall and the closure cap.

11. An aspirating type flowable product dispenser as defined in claim 10, in which an annular inner-peripheral portion of said annular valve extends into the said chamber into sealing engagement with the said plunger, the said product valve seating against the under surface of said annular valve in the raised position of the plunger and being unseated therefrom in the depressed position of the plunger.

12. An aspirating type flowable product dispenser as defined in claim 9, in which the said groove extends radially across the side-walls and bottom of the annular channel and thence radially inwardly across the lower face of the closure cap to communicate with the central aperture of said cap and thus with the atmosphere.

* * * * *